US011215217B2

(12) United States Patent
Moss et al.

(10) Patent No.: US 11,215,217 B2
(45) Date of Patent: Jan. 4, 2022

(54) SURFACE MOUNT

(71) Applicant: House of Atlas, LLC, Evanston, IL (US)

(72) Inventors: Jason Moss, Libertyville, IL (US); Alan Arthur Ford, Sturgis, MI (US)

(73) Assignee: House of Atlas, LLC, Evanston, IL (US)

( * ) Notice: Subject to any disclaimer, the term of this patent is extended or adjusted under 35 U.S.C. 154(b) by 0 days.

(21) Appl. No.: 16/831,478

(22) Filed: Mar. 26, 2020

(65) Prior Publication Data

US 2020/0224709 A1     Jul. 16, 2020

Related U.S. Application Data

(63) Continuation-in-part of application No. 29/638,089, filed on Feb. 23, 2018, now Pat. No. Des. 899,895.

(51) Int. Cl.
*A45D 42/14*      (2006.01)
*F16B 47/00*      (2006.01)
*F16M 13/02*      (2006.01)

(52) U.S. Cl.
CPC ......... *F16B 47/006* (2013.01); *F16M 13/022* (2013.01)

(58) Field of Classification Search
CPC ....... F16M 13/022; F16B 47/006; F16B 5/00; F16B 5/02
See application file for complete search history.

(56) References Cited

U.S. PATENT DOCUMENTS

| | | |
|---|---|---|
| 453,631 A | 6/1891 | Farley |
| 666,467 A | 1/1901 | Clark |
| 1,374,026 A | 4/1921 | Nelson |
| 1,401,727 A | 12/1921 | Pimlott |
| 1,679,881 A | 10/1925 | Simpson |
| 1,756,716 A | 4/1930 | Whitney |
| 1,837,340 A | 12/1931 | Schwartz |
| 1,951,660 A | 3/1934 | Klaudt |
| 2,275,330 A | 3/1942 | Tveten |
| 2,293,168 A | 8/1942 | Pirone |
| 2,637,555 A | 5/1953 | Klaudt |
| 2,661,850 A | 12/1953 | Fowler et al. |
| 2,903,141 A | 9/1959 | Seewack |
| 2,974,806 A | 3/1961 | Seewack |
| 3,004,743 A | 10/1961 | Wenger |
| 3,180,604 A * | 4/1965 | Hammer .............. G03B 42/025 248/205.8 |
| 3,560,032 A | 2/1971 | Cohen et al. |
| 3,674,294 A | 7/1972 | Kirkham |
| 4,012,961 A | 3/1977 | Kent |
| 4,134,703 A | 1/1979 | Hinners |
| 4,147,199 A | 4/1979 | Cameron |

(Continued)

OTHER PUBLICATIONS

U.S. Appl. No. 17/131,382, filed Dec. 22, 2020, 43 pages.
"Curtain Rod Bracket." More than one year before Feb. 23, 2018, 2 pages.
"Suction Cup Hooks, Pack of 12—Locking System—Extra Strong Vacuum Suction Power—Ideal Kitchen or Bath." More than one year before Feb. 23, 2018, 3 pages.

(Continued)

*Primary Examiner* — Amy J. Sterling
(74) *Attorney, Agent, or Firm* — Fitch, Even, Tabin & Flannery LLP (57) ABSTRACT

A surface mount is provided having a body, a lever, a laterally offset connector, and a diaphragm. The surface mount may be mounted to a surface at the diaphragm and support an object via the connector.

22 Claims, 8 Drawing Sheets

(56) References Cited

U.S. PATENT DOCUMENTS

| | | |
|---|---|---|
| 4,254,815 A | 3/1981 | Comeau |
| 4,274,467 A | 6/1981 | Comeau |
| 4,276,920 A | 7/1981 | Comeau |
| 4,301,852 A | 11/1981 | Comeau |
| 4,419,026 A | 12/1983 | Leto |
| 4,438,799 A | 3/1984 | Comeau |
| 4,471,275 A | 9/1984 | Comeau |
| 4,492,262 A | 1/1985 | Comeau |
| 4,495,671 A | 1/1985 | Comeau |
| 4,519,433 A | 5/1985 | Comeau |
| 4,607,677 A | 8/1986 | Comeau |
| 4,619,305 A | 10/1986 | Comeau |
| 4,712,457 A | 12/1987 | Percivalle |
| 4,895,471 A | 1/1990 | Geltz |
| 4,919,185 A | 4/1990 | Comeau |
| 4,955,421 A | 9/1990 | Torti |
| D324,328 S | 3/1992 | Marlene |
| D327,421 S | 6/1992 | Marlene |
| D329,294 S | 9/1992 | DuBeau |
| 5,143,336 A | 9/1992 | McMichael |
| 5,156,281 A | 10/1992 | Schwartz |
| 5,180,130 A | 1/1993 | McMichael |
| 5,259,520 A | 11/1993 | Roggio |
| 5,303,832 A | 4/1994 | Tu |
| D346,699 S | 5/1994 | Greger |
| D349,002 S | 7/1994 | Greger |
| 5,330,061 A | 7/1994 | Geltz |
| 5,333,665 A | 8/1994 | Safar |
| D356,725 S | 3/1995 | McMichael |
| 5,433,551 A | 7/1995 | Gordon |
| D364,767 S | 12/1995 | McLinden |
| D371,829 S | 7/1996 | Greger |
| D372,963 S | 8/1996 | Luca, Jr. |
| 5,544,692 A | 8/1996 | McMichael |
| 5,564,666 A | 10/1996 | Pfeil |
| 5,615,721 A | 4/1997 | Winter |
| D380,141 S | 6/1997 | McMichael |
| 5,653,057 A | 8/1997 | Gary |
| D383,921 S | 9/1997 | Newkirk |
| D385,478 S | 10/1997 | Luca, Jr. |
| 5,678,703 A | 10/1997 | Sawyer |
| D388,267 S | 12/1997 | Newkirk |
| 5,702,010 A | 12/1997 | Liang |
| D388,642 S | 1/1998 | Winter |
| D388,693 S | 1/1998 | Luca, Jr. |
| D389,352 S | 1/1998 | Marlene |
| D391,842 S | 3/1998 | Sartini |
| D392,135 S | 3/1998 | Marlene |
| D392,484 S | 3/1998 | Yemini |
| D394,771 S | 6/1998 | Hofman |
| 5,771,726 A | 6/1998 | Bibby |
| D395,773 S | 7/1998 | Hofman |
| D395,971 S | 7/1998 | Hofman |
| D396,157 S | 7/1998 | Hofman |
| D396,585 S | 8/1998 | Hofman |
| D397,567 S | 9/1998 | Hofman |
| D398,468 S | 9/1998 | Yemini |
| D404,639 S | 1/1999 | Samelson |
| D404,948 S | 2/1999 | Yemini |
| D407,934 S | 4/1999 | Wojtowicz |
| D408,185 S | 4/1999 | Hofman |
| D408,272 S | 4/1999 | Caron |
| D408,721 S | 4/1999 | Sartini |
| D408,722 S | 4/1999 | Sartini |
| 5,894,610 A | 4/1999 | Winter |
| D409,424 S | 5/1999 | Hofman |
| D409,898 S | 5/1999 | Bredemeier |
| D410,193 S | 5/1999 | Bredemeier |
| D410,361 S | 6/1999 | Baranski |
| D410,377 S | 6/1999 | Bredemeier |
| D411,951 S | 7/1999 | Baranski |
| D412,433 S | 8/1999 | Bredemeier |
| D412,827 S | 8/1999 | Bredemeier |
| D415,916 S | 11/1999 | Hofman |
| D416,416 S | 11/1999 | Kelso |
| D416,728 S | 11/1999 | Kelso |
| D417,390 S | 12/1999 | Hofman |
| D417,605 S | 12/1999 | Sartini |
| D417,809 S | 12/1999 | Hofman |
| D417,990 S | 12/1999 | Yemini |
| D417,991 S | 12/1999 | Hofman |
| 5,996,674 A | 12/1999 | Gatewood |
| 5,996,791 A | 12/1999 | Bibby |
| D421,692 S | 3/2000 | Wojtowicz |
| 6,045,111 A | 4/2000 | Hsieh |
| D426,763 S | 6/2000 | Adler |
| D426,992 S | 6/2000 | Walker |
| D429,934 S | 8/2000 | Hofman |
| D433,618 S | 11/2000 | Bredemeier |
| D436,487 S | 1/2001 | Walker |
| D437,693 S | 2/2001 | Harwanko |
| 6,193,197 B1 | 2/2001 | Lian |
| D438,448 S | 3/2001 | Batting |
| D442,394 S | 5/2001 | Walker |
| D443,162 S | 6/2001 | Winter |
| D443,813 S | 6/2001 | Harwanko |
| D444,017 S | 6/2001 | Walker |
| 6,250,839 B1 | 6/2001 | Lenhart |
| D450,947 S | 11/2001 | Walker |
| 6,317,904 B1 | 11/2001 | David |
| D453,652 S | 2/2002 | Walker |
| D454,730 S | 3/2002 | Harwanko |
| D456,167 S | 4/2002 | Harwanko |
| D456,638 S | 5/2002 | Walker |
| D456,658 S | 5/2002 | Harwanko |
| D458,790 S | 6/2002 | Harwanko |
| D458,791 S | 6/2002 | Harwanko |
| D459,201 S | 6/2002 | Michaelson |
| 6,443,207 B1 | 9/2002 | Cheng |
| D464,867 S | 10/2002 | Samelson |
| D465,996 S | 11/2002 | Suero, Jr. |
| 6,478,271 B1 | 11/2002 | Mulholland |
| D466,798 S | 12/2002 | Rebman |
| D466,799 S | 12/2002 | Suero, Jr. |
| D470,332 S | 2/2003 | Clucas |
| D470,337 S | 2/2003 | Clucas |
| D470,394 S | 2/2003 | Harwanko |
| 6,530,120 B2 | 3/2003 | Samelson |
| D472,453 S | 4/2003 | Rebman |
| D472,747 S | 4/2003 | Walker |
| D472,748 S | 4/2003 | Walker |
| 6,543,629 B1 | 4/2003 | Samelson |
| D475,229 S | 6/2003 | Suero, Jr. |
| D475,551 S | 6/2003 | Kelso |
| D475,560 S | 6/2003 | Suero, Jr. |
| D475,561 S | 6/2003 | Suero, Jr. |
| D475,562 S | 6/2003 | Suero, Jr. |
| D475,857 S | 6/2003 | Harwanko |
| D476,828 S | 7/2003 | Harwanko |
| D479,932 S | 9/2003 | Clucas |
| D482,223 S | 11/2003 | Bibby |
| 6,640,867 B1 | 11/2003 | Pallotta |
| 6,651,831 B2 | 11/2003 | Samelson |
| D483,251 S | 12/2003 | Suero, Jr. |
| D483,969 S | 12/2003 | Maholick |
| D484,027 S | 12/2003 | Clucas |
| D484,345 S | 12/2003 | Clucas |
| 6,666,420 B1 | 12/2003 | Carnevali |
| D485,104 S | 1/2004 | Suero, Jr. |
| D485,462 S | 1/2004 | Suero, Jr. |
| D485,464 S | 1/2004 | Clucas |
| 6,681,831 B1 | 1/2004 | Cheng |
| D487,653 S | 3/2004 | Harwanko |
| D488,004 S | 4/2004 | Clucas |
| D488,319 S | 4/2004 | Harwanko |
| D488,945 S | 4/2004 | Bibby |
| D490,253 S | 5/2004 | Clucas |
| D491,445 S | 6/2004 | Clucas |
| D491,448 S | 6/2004 | Rebman |
| D491,731 S | 6/2004 | Harwanko |
| D491,742 S | 6/2004 | Harwanko |
| D491,751 S | 6/2004 | Harwanko |
| D491,752 S | 6/2004 | Harwanko |
| 6,761,202 B1 | 7/2004 | Cheng |

(56) References Cited

U.S. PATENT DOCUMENTS

| | | |
|---|---|---|
| D494,052 S | 8/2004 | Winter |
| D494,455 S | 8/2004 | Winter |
| D494,845 S | 8/2004 | Winter |
| D495,523 S | 9/2004 | Harwanko |
| D495,528 S | 9/2004 | Harwanko |
| D495,591 S | 9/2004 | Clucas |
| D498,630 S | 11/2004 | Suero, Jr. |
| 6,823,925 B2 | 11/2004 | Militello |
| 6,824,000 B2 | 11/2004 | Samelson |
| D499,286 S | 12/2004 | Harwanko |
| D499,296 S | 12/2004 | Suero, Jr. |
| D499,329 S | 12/2004 | Suero, Jr. |
| D500,225 S | 12/2004 | Suero, Jr. |
| D500,670 S | 1/2005 | Rebman |
| D501,106 S | 1/2005 | Suero, Jr. |
| 6,865,817 B2 | 3/2005 | Militello |
| D504,310 S | 4/2005 | Harwanko |
| D504,807 S | 5/2005 | Harwanko |
| D505,062 S | 5/2005 | Suero, Jr. |
| D505,317 S | 5/2005 | Harwanko |
| D505,614 S | 5/2005 | Barrese |
| 6,948,545 B1 | 9/2005 | Cheng |
| 6,959,752 B2 | 11/2005 | Huang |
| 6,962,186 B2 | 11/2005 | Hsu |
| 6,966,353 B2 | 11/2005 | Hsu |
| 6,966,530 B2 | 11/2005 | Hsu |
| D513,142 S | 12/2005 | Suero, Jr. |
| D513,373 S | 1/2006 | Harwanko |
| 6,994,143 B2 | 2/2006 | McCarty |
| 7,000,521 B1 | 2/2006 | Cheng |
| D516,902 S | 3/2006 | Harwanko |
| D522,844 S | 6/2006 | Harwanko |
| D522,845 S | 6/2006 | Suero, Jr. |
| D522,846 S | 6/2006 | Suero, Jr. |
| D522,847 S | 6/2006 | Suero, Jr. |
| D525,115 S | 7/2006 | Harwanko |
| D525,813 S | 8/2006 | Beasley |
| D526,520 S | 8/2006 | Clucas |
| D527,246 S | 8/2006 | Clucas |
| 7,128,124 B2 | 10/2006 | Bibby |
| D534,793 S | 1/2007 | Suero, Jr. |
| D538,571 S | 3/2007 | Militello |
| D539,064 S | 3/2007 | Militello |
| 7,194,811 B2 | 3/2007 | Militello |
| 7,195,051 B2 | 3/2007 | Nien |
| D540,568 S | 4/2007 | Clucas |
| D542,392 S | 5/2007 | Hanley |
| D542,897 S | 5/2007 | Harwanko |
| D543,747 S | 6/2007 | Harwanko |
| D543,748 S | 6/2007 | Harwanko |
| D544,786 S | 6/2007 | Barrese |
| D545,180 S | 6/2007 | Harwanko |
| 7,225,850 B2 | 6/2007 | McCarty |
| D546,177 S | 7/2007 | Ei-Afandiali |
| D547,165 S | 7/2007 | Barrese |
| D547,166 S | 7/2007 | Barrese |
| D547,167 S | 7/2007 | Barrese |
| D548,042 S | 8/2007 | Smyczek |
| D548,574 S | 8/2007 | Harwanko |
| D549,506 S | 8/2007 | Stacy |
| 7,255,149 B2 | 8/2007 | Rossato |
| D551,010 S | 9/2007 | Woodhouse |
| 7,264,035 B2 | 9/2007 | Rossato |
| D560,924 S | 2/2008 | Walker |
| D562,608 S | 2/2008 | Kramer |
| D562,609 S | 2/2008 | Kramer |
| 7,331,370 B1 | 2/2008 | Militello |
| D563,136 S | 3/2008 | Kramer |
| D563,138 S | 3/2008 | Kramer |
| D563,209 S | 3/2008 | Samelson |
| D566,991 S | 4/2008 | Harwanko |
| D568,656 S | 5/2008 | Kramer |
| D569,149 S | 5/2008 | Walker |
| D569,668 S | 5/2008 | Kramer |
| D571,136 S | 6/2008 | Kramer |
| D573,386 S | 7/2008 | Clucas |
| D573,387 S | 7/2008 | Walker |
| 7,407,237 B2 | 8/2008 | Bright |
| D576,475 S | 9/2008 | Didehvar |
| D576,476 S | 9/2008 | Didehvar |
| D577,281 S | 9/2008 | Barrese |
| D582,760 S | 12/2008 | Barrese |
| D586,647 S | 2/2009 | Didehvar |
| D587,917 S | 3/2009 | Barrese |
| D590,238 S | 4/2009 | Richter |
| D590,696 S | 4/2009 | Carnevali |
| D591,142 S | 4/2009 | Cittadino |
| D591,522 S | 5/2009 | Barrese |
| 7,549,615 B2 | 6/2009 | Shevick |
| 7,562,689 B1 | 7/2009 | Militello |
| 7,578,487 B2 | 8/2009 | Kaneda |
| D599,140 S | 9/2009 | Winter |
| 7,600,549 B2 | 10/2009 | Cheng |
| 7,607,622 B2 | 10/2009 | Carnevali |
| 7,628,362 B2 * | 12/2009 | Song .................... F16B 47/003 248/205.8 |
| D607,309 S | 1/2010 | Barrese |
| 7,665,500 B2 | 2/2010 | Rossato |
| D611,328 S | 3/2010 | Hanley |
| D611,329 S | 3/2010 | Barrese |
| D611,330 S | 3/2010 | Barrese |
| D614,478 S | 4/2010 | Barrese |
| D614,479 S | 4/2010 | Barrese |
| D614,938 S | 5/2010 | Barrese |
| D614,939 S | 5/2010 | Barrese |
| 7,708,245 B2 | 5/2010 | Woo |
| 7,712,720 B1 | 5/2010 | Cheng |
| D618,538 S | 6/2010 | Barrese |
| 7,748,673 B2 | 7/2010 | Barrese |
| D624,807 S | 10/2010 | Barrese |
| D625,987 S | 10/2010 | Barrese |
| 7,819,166 B2 | 10/2010 | Militello |
| D628,000 S | 11/2010 | Lindo |
| D628,875 S | 12/2010 | Padilla |
| 7,850,133 B2 | 12/2010 | Carnevali |
| 7,857,151 B2 | 12/2010 | Barrese |
| D630,088 S | 1/2011 | Kim |
| D630,089 S | 1/2011 | Kim |
| D630,498 S | 1/2011 | Kim |
| D632,513 S | 2/2011 | Cittadino |
| D632,514 S | 2/2011 | Didehvar |
| D632,515 S | 2/2011 | Cittadino |
| 7,877,824 B2 | 2/2011 | Grant |
| D633,780 S | 3/2011 | Barrese |
| D635,807 S | 4/2011 | Lindo |
| 7,926,127 B2 | 4/2011 | Barrese |
| D637,854 S | 5/2011 | DeSanto |
| D637,856 S | 5/2011 | LaBarre |
| D637,892 S | 5/2011 | Barrese |
| D640,488 S | 6/2011 | Didehvar |
| D641,190 S | 7/2011 | Cittadino |
| D641,191 S | 7/2011 | Walker |
| D641,193 S | 7/2011 | Vaccaro |
| D641,194 S | 7/2011 | Vaccaro |
| 7,975,971 B2 | 7/2011 | Carnevali |
| 7,984,814 B2 | 7/2011 | Didehvar |
| D643,236 S | 8/2011 | Cittadino |
| D643,657 S | 8/2011 | Cittadino |
| D644,050 S | 8/2011 | Cittadino |
| D647,391 S | 10/2011 | Barrese |
| D648,969 S | 11/2011 | Cittadino |
| D649,019 S | 11/2011 | Kim |
| D649,020 S | 11/2011 | Kim |
| D649,352 S | 11/2011 | Cittadino |
| 8,056,873 B1 | 11/2011 | Hanely |
| D650,263 S | 12/2011 | Barrese |
| 8,069,507 B2 | 12/2011 | Didehvar |
| 8,069,999 B2 | 12/2011 | Didehvar |
| 8,079,557 B2 | 12/2011 | Tu |
| D652,236 S | 1/2012 | Walker |
| D652,237 S | 1/2012 | Cittadino |
| D653,067 S | 1/2012 | Cittadino |
| 8,113,361 B2 | 2/2012 | Winter |
| 8,157,111 B2 | 4/2012 | Didehvar |

(56) References Cited

U.S. PATENT DOCUMENTS

| | | |
|---|---|---|
| D660,064 S | 5/2012 | Webb |
| D660,065 S | 5/2012 | Webb |
| D660,066 S | 5/2012 | Webb |
| 8,185,981 B2 | 5/2012 | Didehvar |
| 8,186,509 B2 | 5/2012 | Samelson |
| D661,529 S | 6/2012 | Cittadino |
| D661,927 S | 6/2012 | Cittadino |
| D664,423 S | 7/2012 | Cittadino |
| D664,424 S | 7/2012 | Cittadino |
| 8,214,938 B2 | 7/2012 | Hanley |
| 8,215,501 B2 | 7/2012 | Trettin |
| D666,012 S | 8/2012 | Walker |
| 8,235,336 B2 | 8/2012 | Lin |
| D667,246 S | 9/2012 | Cittadino |
| D667,295 S | 9/2012 | Harwanko |
| D670,521 S | 11/2012 | Cittadino |
| D670,522 S | 11/2012 | Cittadino |
| D670,944 S | 11/2012 | Cittadino |
| D671,347 S | 11/2012 | Cittadino |
| D671,348 S | 11/2012 | Cittadino |
| D671,395 S | 11/2012 | Harwanko |
| D672,178 S | 12/2012 | Walker |
| D672,990 S | 12/2012 | Lindo |
| D672,991 S | 12/2012 | Cittadino |
| 8,341,775 B2 | 1/2013 | Didehvar |
| 8,347,936 B2 | 1/2013 | Martin |
| D680,421 S | 4/2013 | Martin |
| D681,422 S | 5/2013 | Lindo |
| D681,423 S | 5/2013 | Walker |
| D684,037 S | 6/2013 | Harwanko |
| 8,479,932 B2 | 7/2013 | Carney |
| 8,505,129 B2 | 8/2013 | Parker |
| D691,029 S | 10/2013 | Didehvar |
| D691,030 S | 10/2013 | Lindo |
| D691,031 S | 10/2013 | Harwanko |
| 8,561,667 B1 | 10/2013 | Hanley |
| D693,209 S | 11/2013 | Walker |
| 8,573,416 B2 | 11/2013 | Didehvar |
| D696,573 S | 12/2013 | Didehvar |
| D701,745 S | 4/2014 | Stevens |
| D702,112 S | 4/2014 | Cittadino |
| 8,763,822 B2 | 7/2014 | Didehvar |
| 8,814,114 B2 | 8/2014 | Baines |
| D714,414 S | 9/2014 | Wright, III |
| D714,415 S | 9/2014 | Wright, III |
| 8,827,587 B2 | 9/2014 | Didehvar |
| 8,839,980 B2 | 9/2014 | Baines |
| D714,571 S | 10/2014 | Walker |
| 8,851,305 B2 | 10/2014 | Didehvar |
| 8,851,435 B1 | 10/2014 | Bastien |
| 8,869,999 B2 | 10/2014 | Lindo |
| 8,875,770 B1 | 11/2014 | Martin |
| 8,960,456 B2 | 2/2015 | Didehvar |
| 8,978,228 B2 | 3/2015 | Didehvar |
| 8,979,046 B2 | 3/2015 | Woo |
| 9,009,878 B2 | 4/2015 | Baines |
| D729,618 S | 5/2015 | Bastien |
| D730,162 S | 5/2015 | Bastien |
| 9,021,627 B2 | 5/2015 | Parker |
| 9,107,495 B2 | 8/2015 | Lindo |
| 9,107,496 B2 | 8/2015 | Lindo |
| 9,107,529 B2 | 8/2015 | Didehvar |
| 9,107,544 B2 | 8/2015 | Cittadino |
| 9,131,795 B2 | 9/2015 | Didehvar |
| D746,667 S | 1/2016 | Vaccaro |
| 9,271,592 B2 | 3/2016 | Didehvar |
| 9,307,838 B1 | 4/2016 | Blavat |
| 9,357,860 B1 | 6/2016 | Klowan |
| 9,388,837 B1 | 7/2016 | Hanley |
| 9,404,526 B2 | 8/2016 | Huang |
| D769,102 S | 10/2016 | Euchner |
| 9,474,421 B2 | 10/2016 | Baines |
| 9,494,184 B1 | 11/2016 | Lee |
| D779,305 S | 2/2017 | Ku |
| 9,578,995 B2 | 2/2017 | Hanley |
| 9,581,292 B2 * | 2/2017 | Kremer ............... F16B 45/00 |
| D782,279 S | 3/2017 | Baker |
| D783,385 S | 4/2017 | Zhu |
| 9,611,884 B1 | 4/2017 | Kuo |
| 9,618,032 B2 | 4/2017 | Woo |
| D811,205 S | 2/2018 | Hanley |
| D813,021 S | 3/2018 | Hanley |
| D813,022 S | 3/2018 | Hanley |
| 10,034,587 B1 | 7/2018 | Elliot |
| 10,070,748 B2 | 9/2018 | Hanley |
| 10,092,126 B2 | 10/2018 | Baines |
| D837,039 S | 1/2019 | Angus |
| D861,112 S | 9/2019 | Lott |
| D871,891 S | 1/2020 | Emanuel |
| D899,895 S * | 10/2020 | Moss ............... F16B 47/003 |
| | | D8/349 |
| 2002/0175250 A1 | 11/2002 | Lian |
| 2003/0209509 A1 | 11/2003 | Felsenthal |
| 2004/0182806 A1 | 9/2004 | Figueroa |
| 2006/0204322 A1 | 9/2006 | Roiser |
| 2007/0170134 A1 | 7/2007 | Bishop |
| 2008/0163418 A1 | 7/2008 | Barrese |
| 2009/0223642 A1 | 9/2009 | Militello |
| 2009/0223917 A1 | 9/2009 | Grant |
| 2010/0176253 A1 * | 7/2010 | Son ............... A47G 29/093 |
| | | 248/121 |
| 2010/0206492 A1 | 8/2010 | Shevick |
| 2010/0252700 A1 | 10/2010 | Wang |
| 2010/0316438 A1 | 12/2010 | Sohn |
| 2012/0001042 A1 | 1/2012 | Zhong |
| 2012/0005823 A1 | 1/2012 | Baines |
| 2012/0017366 A1 | 1/2012 | Barrese |
| 2012/0152872 A1 | 6/2012 | Didehvar |
| 2012/0152873 A1 | 6/2012 | Didehvar |
| 2012/0152874 A1 | 6/2012 | Didehvar |
| 2012/0241399 A1 | 9/2012 | Trettin |
| 2012/0284914 A1 | 11/2012 | Bauer |
| 2013/0045041 A1 | 2/2013 | Sohn |
| 2013/0112639 A1 | 5/2013 | Baines |
| 2013/0334156 A1 | 12/2013 | Baines |
| 2013/0341474 A1 | 12/2013 | Baines |
| 2014/0131298 A1 | 5/2014 | Didehvar |
| 2014/0166603 A1 | 6/2014 | Baines |
| 2014/0263123 A1 | 9/2014 | Ford |
| 2014/0335976 A1 * | 11/2014 | Hiller ............... F16B 47/006 |
| | | 473/447 |
| 2014/0374553 A1 | 12/2014 | Park |
| 2015/0297038 A1 | 10/2015 | Vaccaro |
| 2016/0201714 A1 | 7/2016 | Zhang |
| 2017/0360261 A1 | 12/2017 | Coratolo |
| 2018/0098656 A1 | 4/2018 | Baines |
| 2018/0296018 A1 | 10/2018 | Baines |

OTHER PUBLICATIONS

"Suction Cup Hooks." More than one year before Feb. 23, 2018, 2 pages.

"SUPOW Bathroom Grab Bar, Strong Suction Shower Handle & Bathroom Balance Bar Anti-slipping Suction Cut Support Assist Handle Grip Hand Rail Helping Tool Wall Mount for Elderly & Children." SUPOW, more than one year before Feb. 23, 2018, 4 pages.

Mainstay Product—18-28 in. Basic Adjustable Curtain Rod (distributed by Wal-Mart Stores, Inc.) <https://www.walmart.com/ip/Mainstays-18-28-in-Basic-Adjustable-Curtain-Rod-2-in -Clearance/50015120>, believed to be publicly available for more than one year before Feb. 23, 2018, 8 pages.

Design U.S. Appl. No. 29/638,089, filed Feb. 23, 2018, 38 pages.

Design U.S. Appl. No. 29/721,523, filed Jan. 21, 2020, 13 pages.

U.S. Appl. No. 62/959,424, filed Jan. 10, 2020, 39 pages.

\* cited by examiner

SURFACE MOUNT

CROSS-REFERENCE TO RELATED APPLICATION

This application is a continuation-in-part of and claims priority to U.S. application Ser. No. 29/638,089, filed Feb. 23, 2018, which is hereby incorporated herein by reference in its entirety.

FIELD

The present disclosure generally relates to surface mounts and, more specifically, to suction cup surface mounts for supporting objects.

BACKGROUND

Suction cup mounts have been used to hang objects for many years. Suction cups may be attached to smooth surfaces such as walls and windows without the need for additional tools and/or hardware. However, suction cups are often limited in the objects they can support, being dedicated to a specific accessory.

Curtain rods are often supported by brackets that are attached to the window casing or the wall surrounding the window. These brackets often require tools and/or hardware to secure the bracket to the window casing or wall.

Thus, there exists a need for a device that can support objects such as a curtain rod without the use of tools and/or hardware.

DETAILED DESCRIPTION

Figure 1:
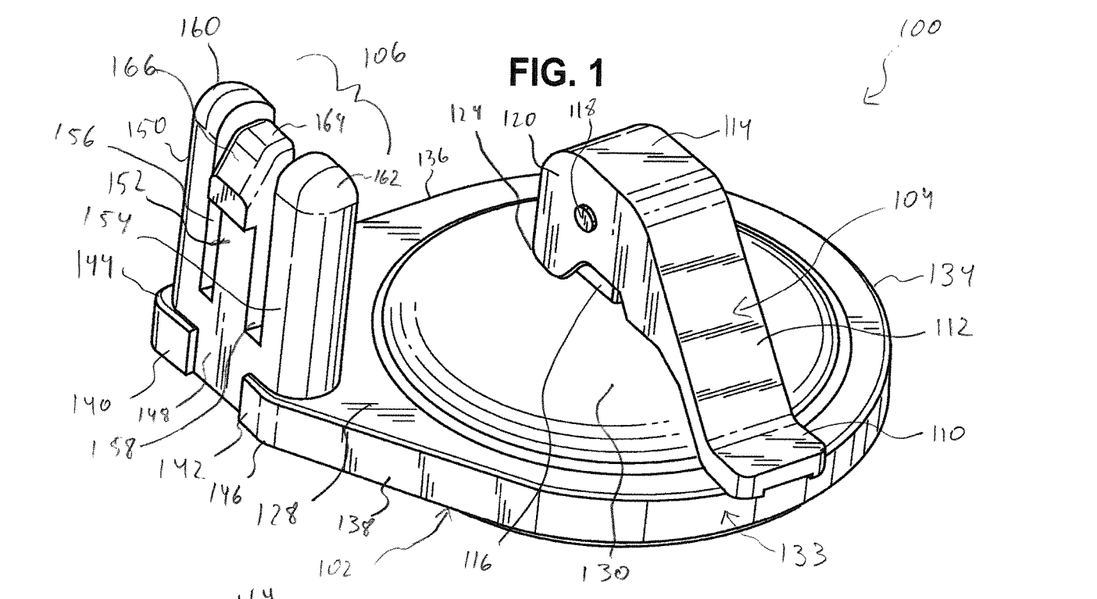
FIG. 1 is a front perspective view of a surface mount in accordance with a first embodiment.
Figure 2:
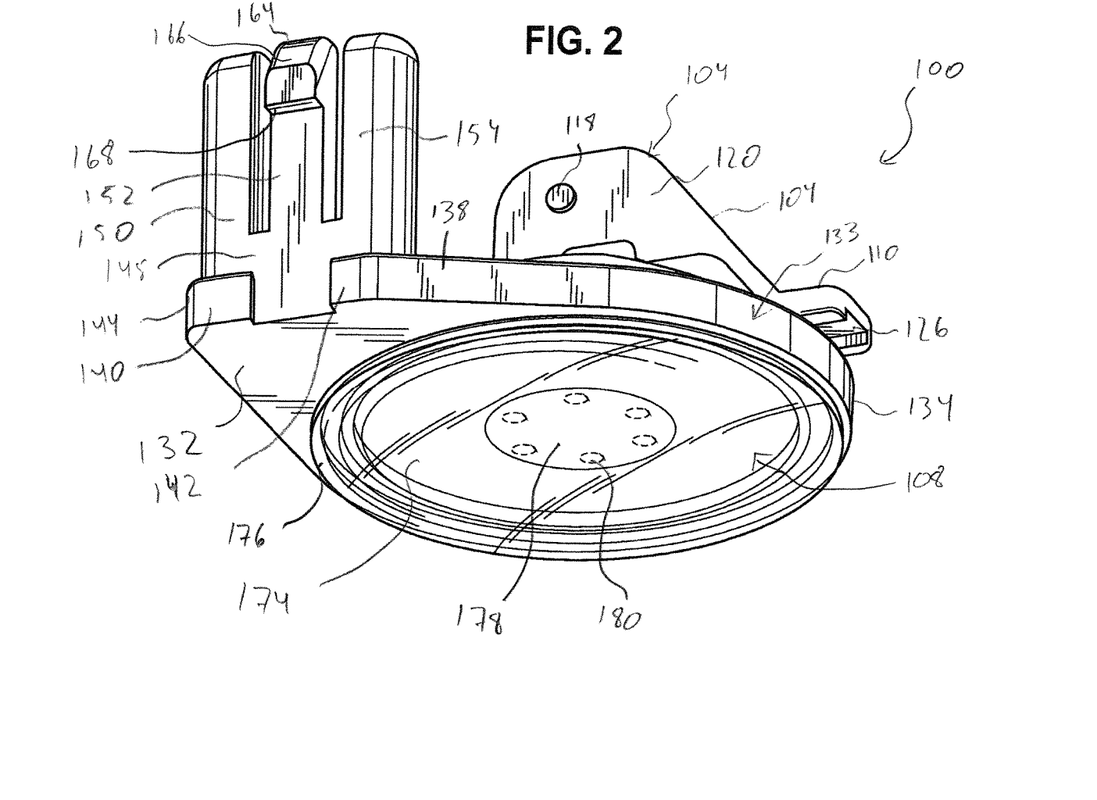
FIG. 2 is a bottom perspective view of the surface mount of FIG. 1.
Figure 3:
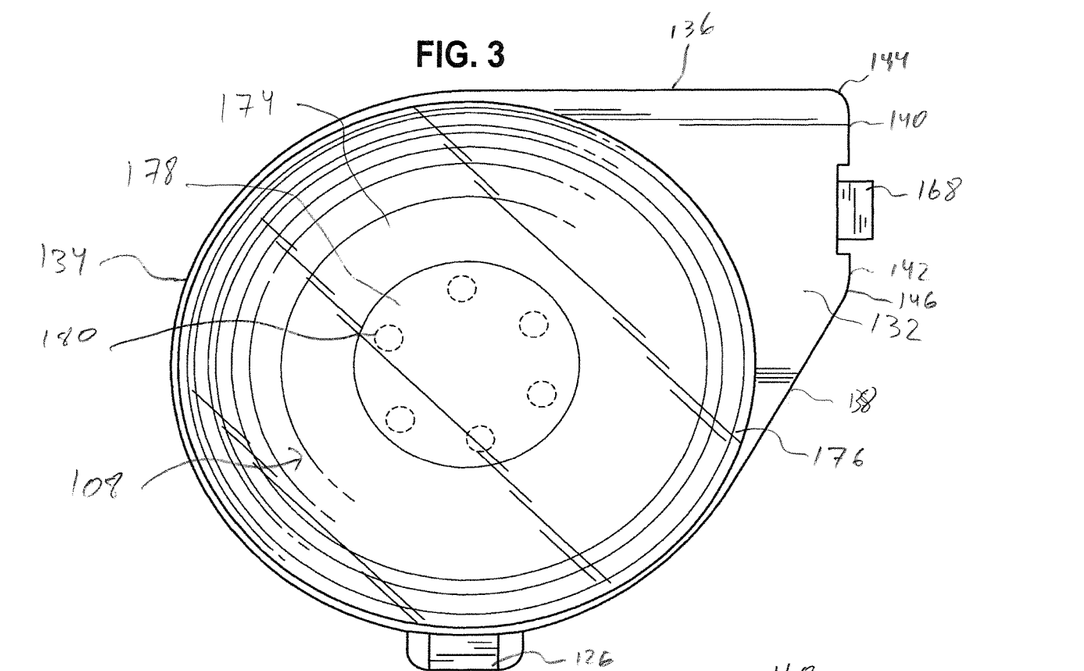
FIG. 3 is a bottom plan view of the surface mount of FIG. 1.
Figure 4:
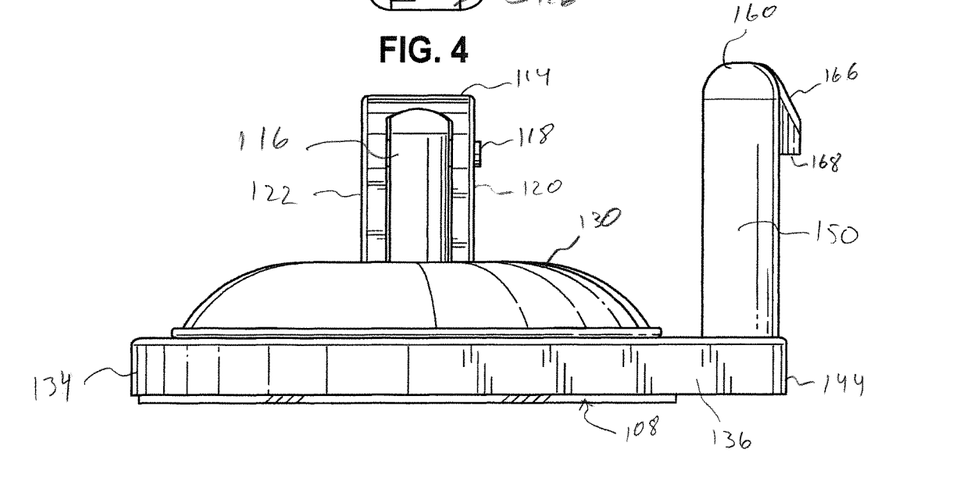
FIG. 4 is a rear side elevation view of the surface mount of FIG. 1.
Figure 5:
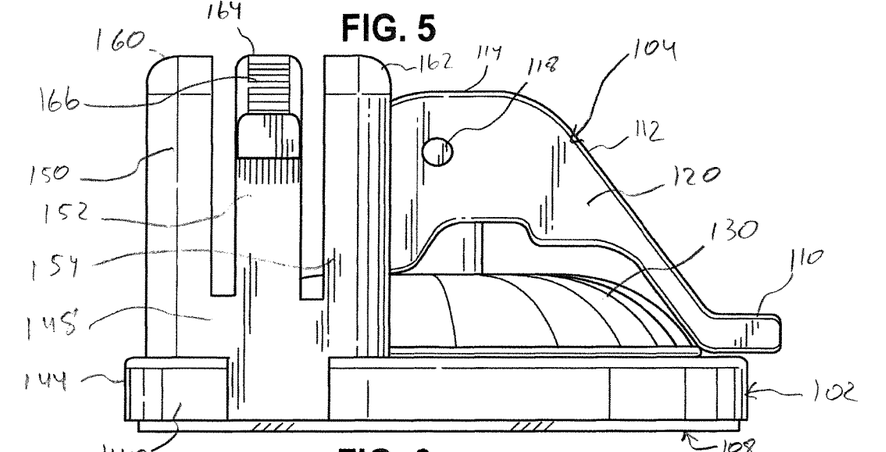
FIG. 5 is a left side elevation view of the surface mount of FIG. 1.
Figure 6:
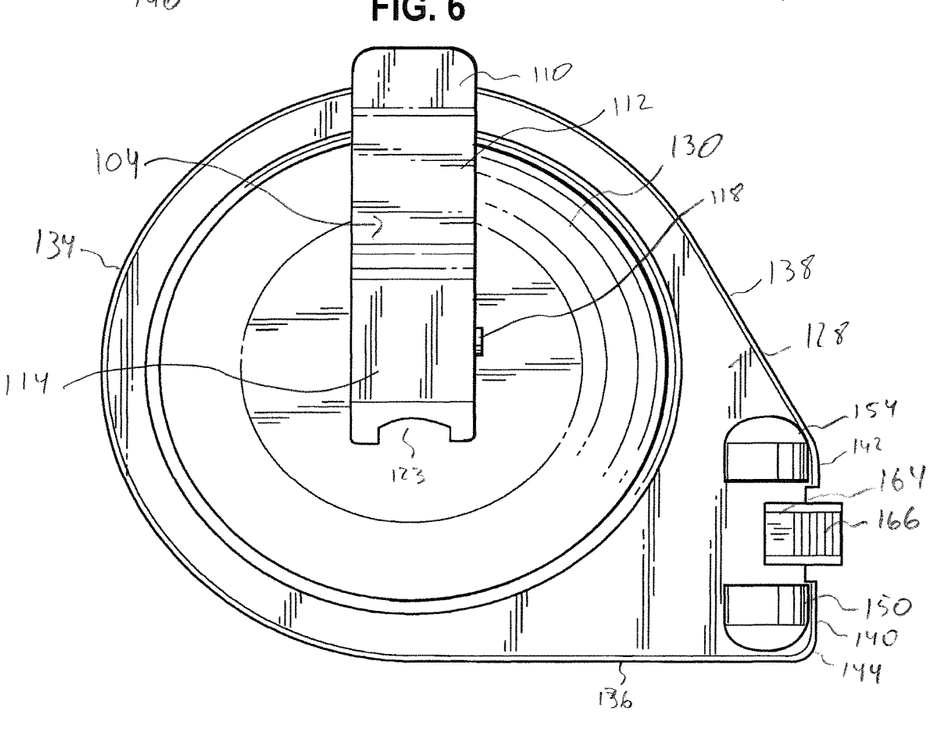
FIG. 6 is a top plan view of the surface mount of FIG. 1.
Figure 7:
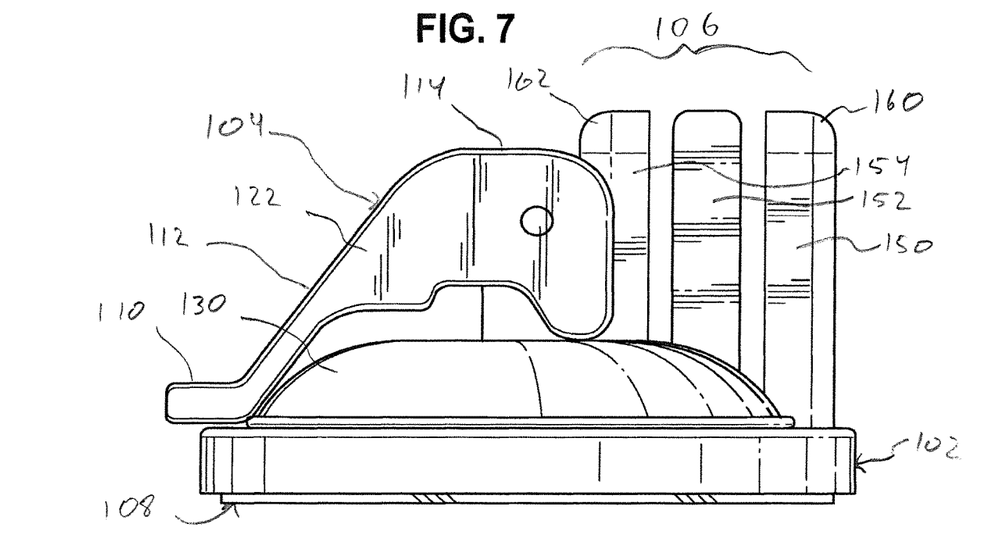
FIG. 7 is a right side elevation view of the surface mount of FIG. 1.
Figure 8:
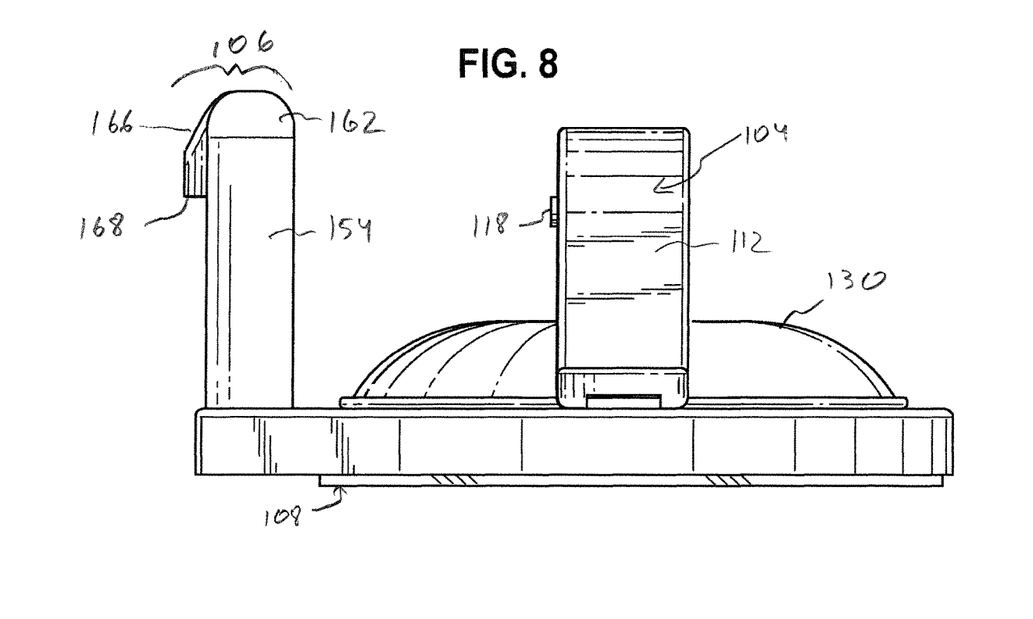
FIG. 8 is a front side elevation view of the surface mount of FIG. 1.

With reference to FIGS. 1-8, a surface mount 100 is provided having a base 102, a lever 104, a connector 106, and a diaphragm 108. The lever 104 includes a handle 110, an arm 112, and a connection portion 114. The handle 110 is connected to a first end of arm 112 at an angle. The second end of arm 112 connects to the connection portion 114. The connection portion 106 is attached to a post 116 by a pin 118. The lever 104 has a first sidewall 120 and a second sidewall 122 on opposite sides of the lever 104 extending from a top surface of the lever 104 toward the base 102. The rear end of the lever 104 at the connection portion 114 defines a cutout 123. The lever 104 further includes a rounded pivot corner 124. The handle 110 defines a recess 126 on its underside.

The base 102 includes a top planar surface 128 surrounding a domed surface 130, a bottom surface 132, and a sidewall surface 133 extending from the top planar surface 128 to the bottom surface 132. The post 116 extends through a central, apex portion of the domed surface 130. The sidewall surface 133 includes a constant radius rounded surface 134, a tangential straight surface 136, a tangential angled surface 138, a first straight surface portion 140, and a second straight surface portion 142. The first straight surface portion 140 connects to the tangential straight surface 136 at the right-angled corner 144 at a left rear corner of the base 102. The tangential straight surface 136 extends along a rear of the base 102 from the right-angled corner 144 and transitions into the constant radius rounded surface 134. The constant radius rounded surface 134 curves clockwise around the domed surface 130 at approximately a constant distance away from the center of the domed surface 130. The constant radius rounded surface 134 extends around the domed surface 130 for approximately 230° before transitioning to the tangential angled surface 138, which extends tangentially from the constant radius rounded surface 134. The tangential angled surface 138 connects to the second straight surface portion 142 at an obtuse angled corner 146 at the left side of the base 102. The first and second straight surface portions 140, 142 are connected by an outer side surface 148 of the connector 106 set inward of the straight surface portions 140, 142. The base 102 is thus formed of a rounded portion surrounding the domed surface 130 and a substantially polygonal portion formed by the tangential straight surface 136, the tangential angled surface 138, and the first and second straight portions 140, 142.

The connector 106 includes a first outer post 150, inner post 152, and a second outer post 154. The posts 150, 152, 154 project from the base 102 in the same direction. The first outer post 150 is separated from the inner post 152 by a first groove 156. The inner post 152 is separated from the second outer post 154 by a second groove 158. The first and second outer posts 150, 154 have a rounded terminal end 160, 162 opposite the base 102. The inner post 152 has a stepped barb tip 164 on an end opposite the base 102. The stepped barb tip 164 has an angled surface 166 and a barb hook surface 168 on a side of the inner post 152 facing away from the lever 104. The connection portion 106 is configured to extend into a complementary socket of another object.

In the embodiment shown in FIGS. 1-8, the connector 106 is laterally offset to the left and rear of the domed surface 130 of the base 102 in the area of the base 102 formed by the tangential straight surface 136 and the tangential angled surface 138. The connector 106 is disposed along the sidewall of the base 102 extending from the right-angled corner 144 along the first and second straight portions 140, 142, the obtuse angled corner 146, and a portion of the tangential angled surface 138.

The diaphragm 108 is disposed adjacent the bottom surface 132 of the base 102. The diaphragm 108 has a concave shaped bottom surface 174. An outer perimeter of the diaphragm 108 forms a circular rim 176. A plate 178 is located at the central portion of the diaphragm 108. The plate 178 defines a series of apertures 180 spaced about a perimeter of the plate 178. The base 112 extends radially outward of the circular rim 176 of the diaphragm 108.

Figure 9:
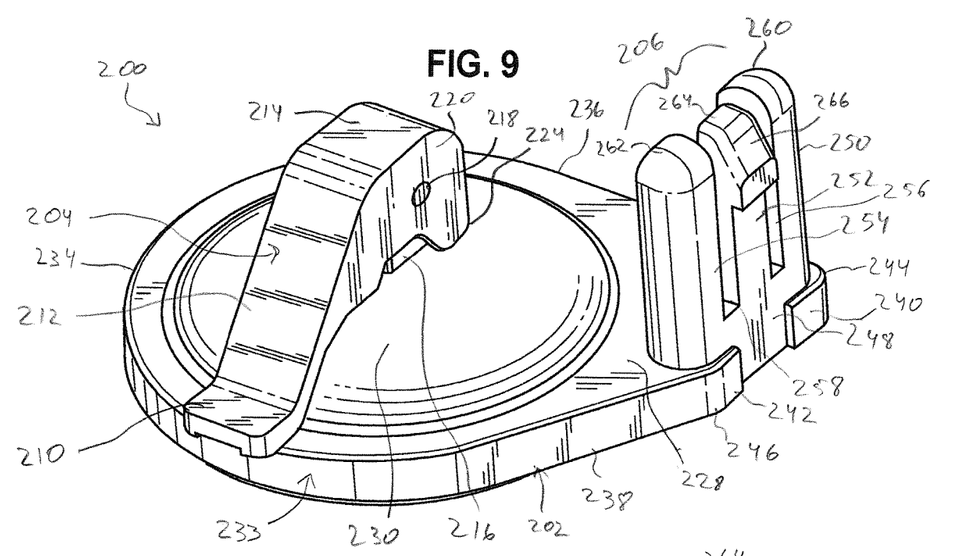
FIG. 9 is a front perspective view of a surface mount in accordance with a second embodiment.
Figure 10:
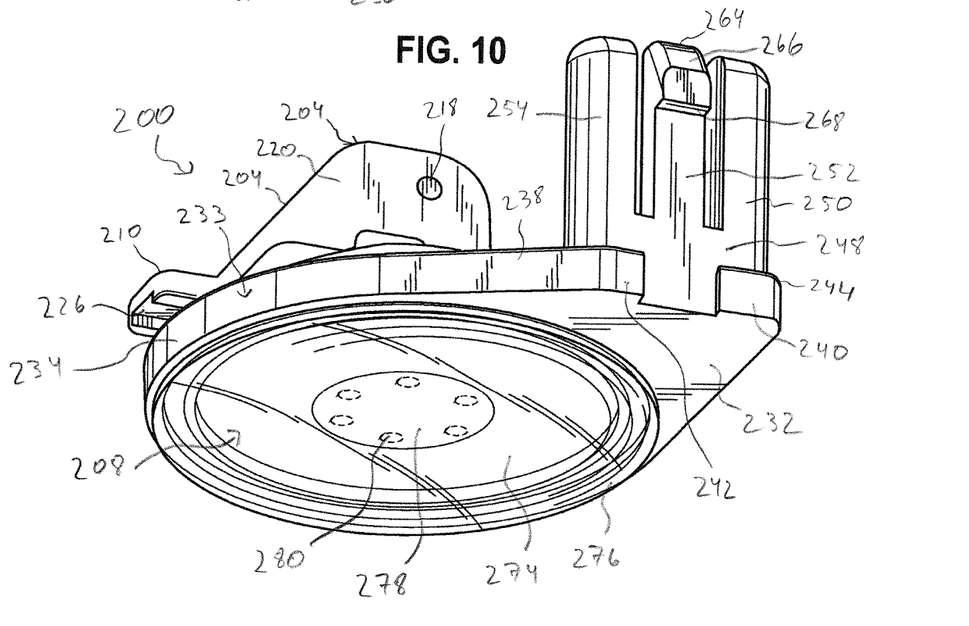
FIG. 10 is a bottom perspective view of the surface mount of FIG. 9.
Figure 11:
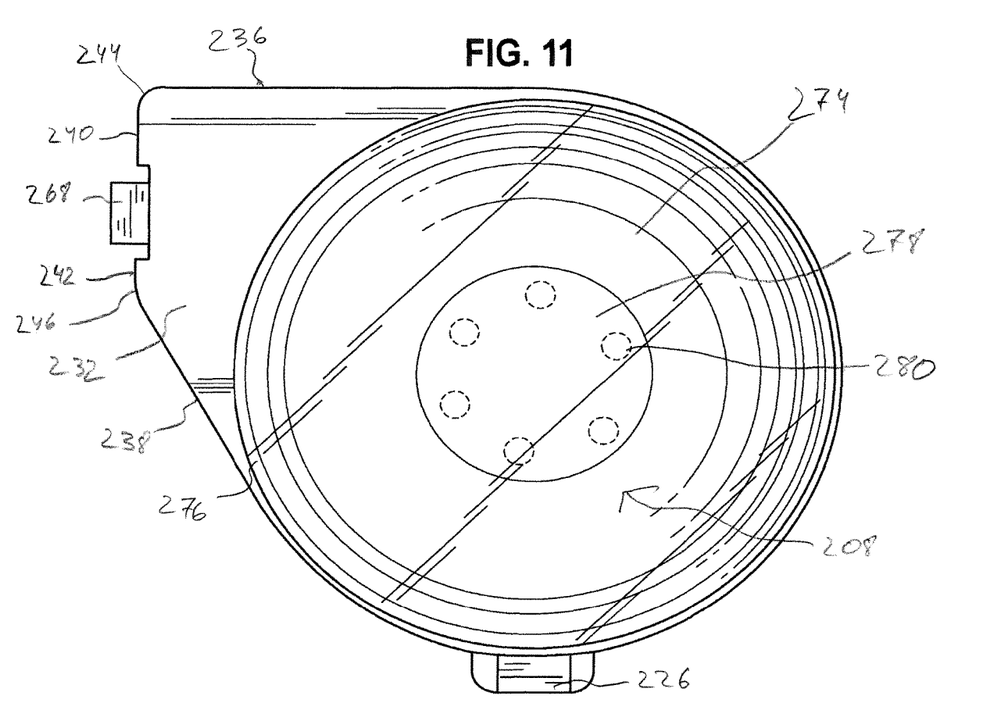
FIG. 11 is a bottom plan view of the surface mount of FIG. 9.
Figure 12:
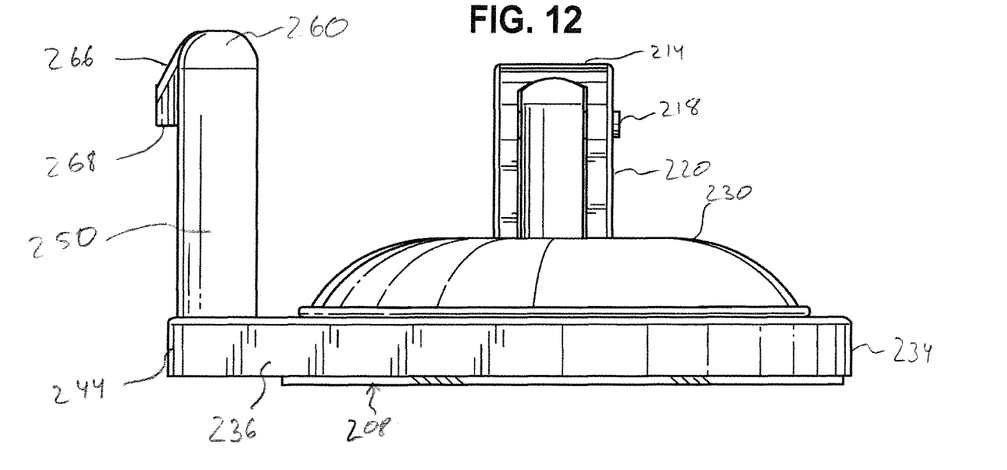
FIG. 12 is a rear side elevation view of the surface mount of FIG. 9.
Figure 13:
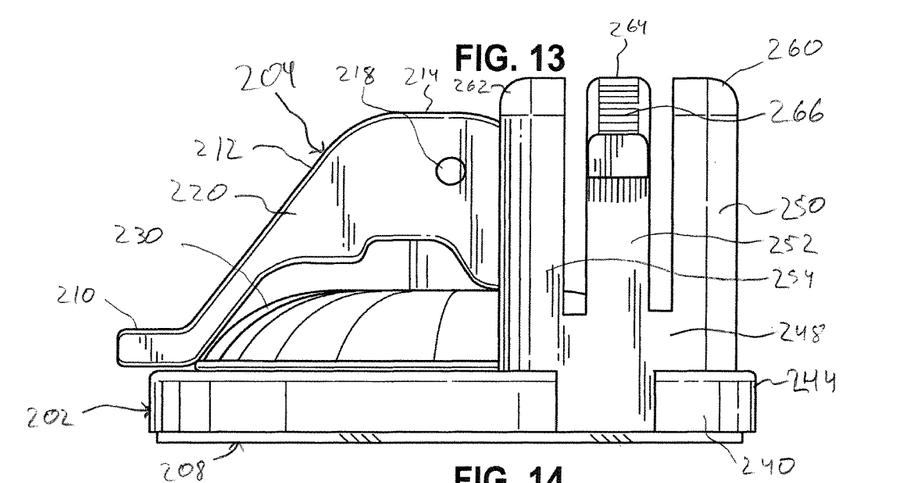
FIG. 13 is a right side elevation view of the surface mount of FIG. 9.
Figure 14:
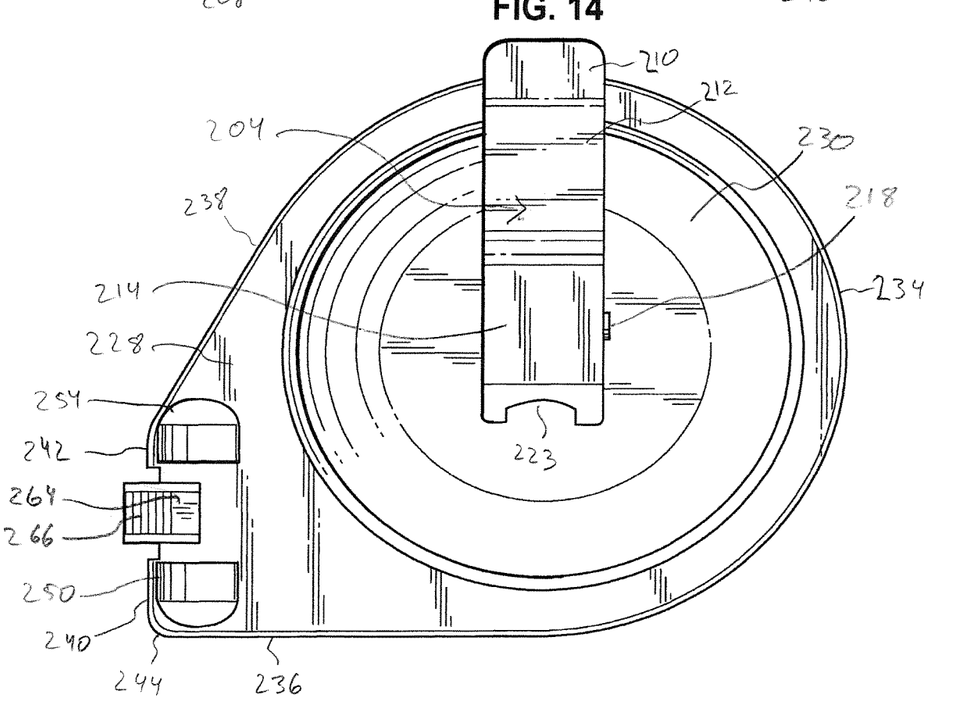
FIG. 14 is a top plan view of the surface mount of FIG. 9.
Figure 15:
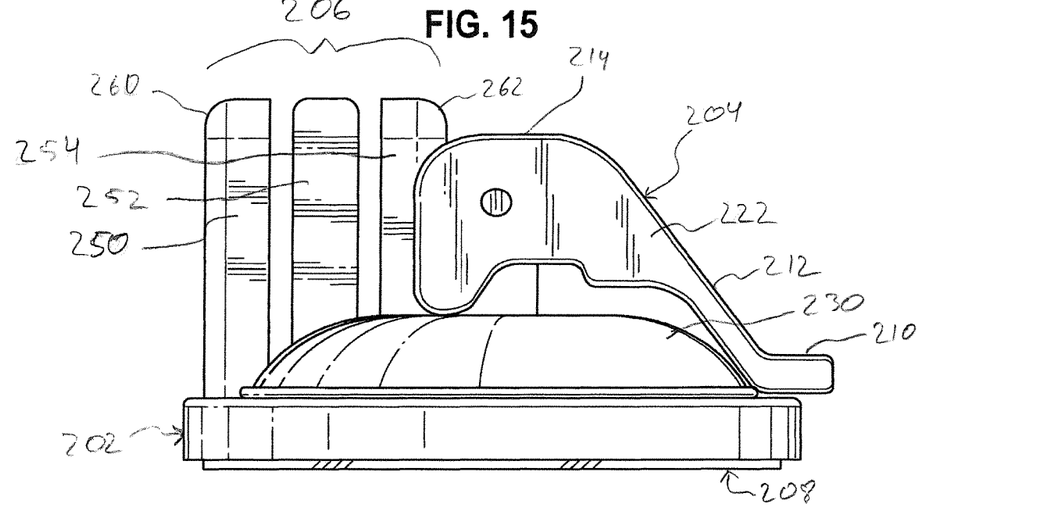
FIG. 15 is a left side elevation view of the surface mount of FIG. 9.
Figure 16:
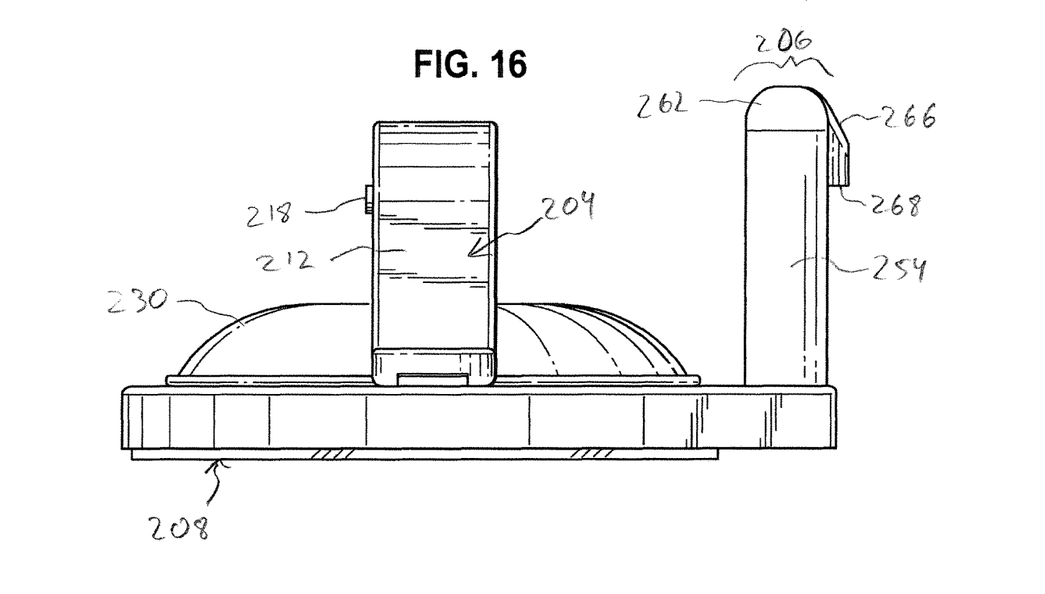
FIG. 16 is a front side elevation view of the surface mount of FIG. 9.

Turning now to FIGS. 9-16, a second embodiment of a surface mount 200 is shown. The surface mount 200 has the same features as the surface mount 100 of the first embodiment shown in FIGS. 1-8 but is arranged in a different manner. The second embodiment is a mirror image of the first embodiment reflected over the axis formed by the lever 204. In the second embodiment of FIGS. 9-16, the connector 206 is on the right rear portion of the surface mount 200 rather than on the left rear portion, as is shown in the first embodiment.

For simplicity, features of the second embodiment that correspond to features of the first embodiment are shown with a "2" replacing the leading "1" of the reference numeral of the first embodiment. For example, a feature having reference numeral "102" in the first embodiment has reference numeral "202" in the second embodiment.

Regarding the configuration of the base 202, the first straight surface portion 240 connects to the tangential straight surface 236 at the right-angled corner 244 at the right rear corner of the base 202. The tangential straight surface 236 extends along the rear of the base 202 from the right-angled corner 244 and transitions into the constant radius rounded surface 234. The constant radius rounded surface 234 curves counterclockwise around the domed surface 230 at approximately a constant distance away from a center of the domed surface 230. The constant radius rounded surface 234 extends around the domed surface 230 for approximately 230° before transitioning to the tangential angled surface 238, which extends tangentially from the constant radius rounded surface 234. The tangential angled surface 238 connects to the second straight surface portion 242 at the obtuse angled corner 246 at the right side of the base 202. The first and second straight surface portions 240, 242 are connected by an outer side surface 248 of connector 206 set inward of the straight surface portion 240, 242.

The connector 206 is laterally offset to the right and rear of the domed surface 230 of the base 202 in the area of the base 202 formed by the tangential straight surface 236 and the tangential angled surface 238. The connector 206 is disposed along the sidewall of the base 202 extending from the right-angled corner 244 along the first and second straight portions 240, 242, the obtuse angled corner 246 on the right side of the surface mount 200, and a portion of the angled surface 238.

What is claimed is:

1. A surface mount comprising:
   a body having a domed portion and an arm portion extending away from the domed portion;
   a lever associated with the domed portion of the body and disposed on a first side of the body;
   a diaphragm disposed on a second side of the body opposite the first side of the body; and
   a connector attached to only the arm portion of the body and the arm portion having a spacer portion separating the connector and the domed portion.

2. The surface mount of claim 1 wherein the lever is attached at an apex of the domed portion, the lever extending longitudinally and defining a longitudinal axis, and the connector being attached to the arm portion laterally of the longitudinal axis.

3. The surface mount of claim 2 wherein a lateral axis is perpendicular to the longitudinal axis and intersects the longitudinal axis at the apex of the domed portion, and the connector being attached to the arm portion laterally of both the longitudinal axis and the lateral axis.

4. The surface mount of claim 1 wherein the connector is attached along an edge of the arm portion.

5. The surface mount of claim 1 wherein the connector includes at least one post.

6. The surface mount of claim 1 wherein the body includes at least one curved sidewall surface and at least one straight sidewall surface.

7. The surface mount of claim 1 wherein the body includes three straight sidewall surfaces.

8. The surface mount of claim 7 wherein the arm portion is defined at least in part by at least a portion of the three sidewall surfaces.

9. The surface mount of claim 1 wherein the spacer portion of the body between the connector and the domed first portion is substantially planar.

10. The surface mount of claim 5 wherein the at least one post includes a plurality of posts.

11. The surface mount of claim 10 wherein the plurality of posts includes an inner post disposed between two outer posts.

12. The surface mount of claim 11 wherein one of the inner and outer posts includes a barbed tip.

13. The surface mount of claim 5 wherein the at least one post includes a barbed tip.

14. The surface mount of claim 1 wherein the lever includes a terminal end defining a recess.

15. The surface mount of claim 1 wherein the diaphragm includes a concave surface.

16. A surface mount comprising:
   a body having a top surface and a bottom surface, the top surface including a domed portion, a rim portion surrounding the domed portion, and substantially planar portion laterally offset from a side of the domed portion;
   a lever associated with a central portion of the domed portion on the top surface of the body;
   a diaphragm at the bottom surface of the body; and
   a connector attached to the substantially planar portion of the body, the substantially planer portion having a spacer portion extending between the domed portion and the connector.

17. The surface mount of claim 16 wherein the substantially planar portion protrudes asymmetrically from the rim portion.

18. The surface mount of claim 16 wherein the connector is attached along an edge of the substantially planar portion.

19. The surface mount of claim 16 wherein the substantially planar portion is bounded by at least one straight edge.

20. The surface mount of claim 19 wherein the at least one straight edge includes a plurality of straight edges.

21. The surface mount of claim 16 wherein the body includes a rounded edge surface being at an angle with the top surface and at least one straight edge surface being at an angle with the top surface.

22. The surface mount of claim 21 wherein the at least one straight edge surface includes a plurality of straight edge surfaces.

* * * * *